(12) United States Patent
Vogt et al.

(10) Patent No.: US 6,290,063 B1
(45) Date of Patent: Sep. 18, 2001

(54) ADJUSTABLE TRAY AND BEVERAGE HOLDER

(76) Inventors: Roger Vogt, 7106 Nahisinh Way, Louisville, KY (US) 40258; Larry Vogt, 4503 Portico Ct., Louisville, KY (US) 40299

(\*) Notice: Subject to any disclaimer, the term of this patent is extended or adjusted under 35 U.S.C. 154(b) by 0 days.

(21) Appl. No.: 09/507,446

(22) Filed: Feb. 19, 2000

(51) Int. Cl.[7] .......................... A45C 11/20; A47G 19/02
(52) U.S. Cl. ........................ 206/549; 220/574; 248/311.2
(58) Field of Search ................................. 220/574, 574.1, 220/575, 23.03, 23.06; 206/541, 549, 557, 561–564; D7/3, 550.1, 552.1, 553.1, 553.2, 553.5, 554.3; 248/311.2; 108/44, 46

(56) References Cited

U.S. PATENT DOCUMENTS

| | | |
|---|---|---|
| D. 251,229 | 3/1979 | Wooters . |
| D. 279,837 | 7/1985 | Tanaka . |
| D. 303,454 | 9/1989 | Morales et al. . |
| D. 317,982 | 7/1991 | Morales . |
| D. 355,336 | 2/1995 | Dickey et al. . |
| D. 367,210 | 2/1996 | McKenny . |
| 1,149,541 | 8/1915 | Rees . |
| 2,706,516 | 4/1955 | Nordmark . |
| 3,462,109 | 8/1969 | Forbes . |
| 3,698,675 | 10/1972 | Lerew et al. . |
| 3,920,211 | 11/1975 | Knight . |
| 4,560,128 | 12/1985 | Willeby et al. . |
| 4,730,760 \* | 3/1988 | Keller ................................. 108/46 X |
| 5,046,433 | 9/1991 | Kramer et al. . |
| 5,114,108 \* | 5/1992 | Olschansky ........................ 248/311.2 |
| 5,143,337 \* | 9/1992 | Tomayko, Jr. et al. ........... 248/311.2 |
| 5,421,459 \* | 6/1995 | Mazzott ............................... 206/549 |
| 5,511,754 | 4/1996 | Johannsen . |
| 5,713,628 | 2/1998 | Lucatuorto . |
| 5,823,360 | 10/1998 | Gorosave . |
| 5,953,999 \* | 9/1999 | Kamehl ................................ 108/44 |

\* cited by examiner

Primary Examiner—Bryon P. Gehman
(74) Attorney, Agent, or Firm—John F. Salazar; Middleton Reutlinger (57) ABSTRACT

A food and beverage tray is described having a supporting L-shaped bracket which is variably adjustable on the tray. Further, the tray has a first and a second strut member which extends rearward from the tray to the bracket providing a compressive force on a vertical supporting member in order to hold the tray steady. Thus, the tray is adjustable on three different structures, on the supporting bracket and on the first and second strut members. The tray itself has a first and second food recess for supporting food items as well as a drink recess for receiving a drink container.

26 Claims, 7 Drawing Sheets

ADJUSTABLE TRAY AND BEVERAGE HOLDER

BACKGROUND OF THE INVENTION

1. Field of the Invention

The present invention relates to food and beverage tray holders and in particularly to food and beverage tray holders which affix themself to a seat or other vertical surface.

2. Discussion of the Prior Art

Food and beverage trays are fairly well known in the art, particularly those holders which clamp onto a seat or car door frame. These prior art devices typically have an inverted U-Shaped bracket which provides vertical support of the tray along the upper edge of a supporting surface. These prior art devices typically rely upon a wide tray body which is directly adjacent to the vertical supporting surface in order to provide sufficient lateral support.

U.S. Pat. No. 5,713,628 discloses such a stadium seat tray for supporting food and beverages relative to the back of a seat. A U-shape support is provided for vertical support of the tray while the wide body of the tray provides sufficient lateral support to prevent the tray from tilting.

U.S. Pat. No. 4,560,128 teaches an additional drink holder wherein a clamp is provided for attachment of the tray to a chair leg or like structure. Lateral support may be provided with a second clamp which is perpendicular, both supporting clamps however requiring sufficient structure to ridgedly clamp thereto.

U.S. Design Pat. No. 317,982 teaches a food tray for use in vehicles where a first and a second inverted U-shaped clamp provide vertical support for the food tray. The wide body of the tray provides lateral support but does not provide adequate adjustability for varying thickness vertical support body members.

The prior art therefor is lacking in a food and beverage tray which has an adequately adjustable retaining bracket for retaining the tray in the vertical position while also providing means to compressively adjust the tray against the vertical supporting surface.

SUMMARY OF THE INVENTION

It is accordingly an object of the present invention to provide a food and beverage tray, which has sufficient surface for placement of multiple food and beverage items while also providing adequate means for adjusting the tray for varying thickness vertical support members. Typically, food and beverage trays are supported by vertical support members, none of which are of standard size. It is therefor an object of the present invention to provide means to adequately adjust the beverage tray for variable thickness vertical support members.

It is a further object of the present invention to provide a food and beverage tray wherein the food and beverage tray has an L-shaped retaining bracket which affixes to the vertical support member.

It is an additional object of the present invention to provide a food and beverage tray wherein the tray has a first and a second food recess in addition to having a drink recess easily accessible to the user.

An additional object of the present invention is to provide an adjustable L-shaped retaining bracket for attachment of the food and beverage tray to a vertical support member while further having means to compressively adjust the tray against the vertical support member.

It is an additional object of the present invention to provide a first and second compressively adjustable strut members with an adjustable L-shaped retaining bracket, all three of which having locking means sufficiently locking all three members in place to provide significant vertical and lateral support and steadiness of the food and beverage tray.

The above objectives are met by the food and beverage tray of the present invention. The food and beverage tray of the present invention has a first and second food recess with a drink recess additionally formed therein. The tray of the present invention has an L-shaped retaining bracket which slides on a first side of the vertical support member to provide vertical support of the tray while additionally providing a first and second strut which provides adjustable compressive forces against the vertical support member to adequately affix the food and beverage tray against the vertical support member. The design of the food and beverage tray of the present invention allows the tray to be securely affixed to any width vertical support member while additionally allowing the tray to be securely affixed to a vertical support member which is not necessarily planar along the supporting surface.

DETAILED DESCRIPTION OF THE PREFERRED EMBODIMENT

Figure 1:
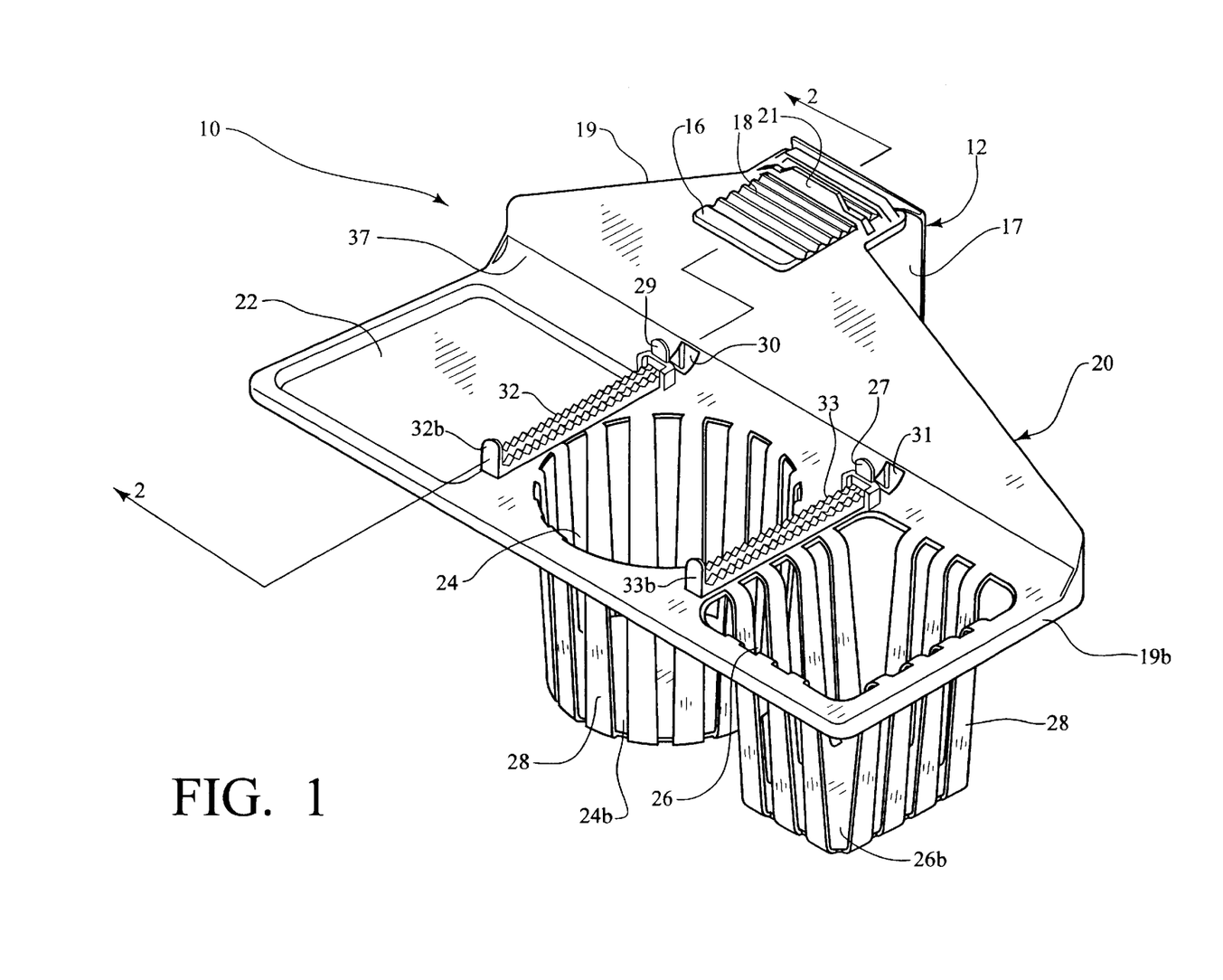
FIG. 1 is a perspective view of the food and beverage tray of the present invention.

The food and beverage tray 10 of the present invention is shown in FIG. 1. The food and beverage tray 10 is comprised of the tray portion 20 having a first food recess 22, second food recess 26 and drink recess 24. The first food recess 22 of the tray of the present invention is designed of sufficient size so as to place a sandwich or other similar type food item. Additionally, second food recess 26 is designed to sufficiently support an retain an additional food item such as a package of french fries, potato chips or similar type item. The drink recess 24 is further designed to securely retain a drink cup or beverage container. The overall size of the tray portion 20 is sufficient to support an entire meal and suspend said meal directly in front of the user along a supporting edge of a vertical support member. While the food and drink recesses 22, 24 and 28 of the present invention are shown in particular geometry in FIG. 1, any recess geometry which will sufficiently support and hold these food and beverage items are contemplated to fall within the design of the present invention and variations of such are easily within one of ordinary skill in the art.

Drink recess 24 is provided with depending ribs 28 which extend around a circular recess oval down to drink recess base member 24b. Drink recess 24, as indicated, is of sufficient diameter to hold and retain an adequate size cup or similar beverage container. Ribs 28, depending below tray 20 and extend to base 24b, provide sufficient support within said recess for said beverage container.

Similarly, as is shown in FIG. 1, second food recess 26 has a plurality of depending ribs 28 which extend from the tray surface downward to the base 26b of the second food recess. In addition, the first food recess 22, shown as a rectangular depressed area in the tray 20, will retain a sandwich or similar food item.

The food and beverage tray 10 of the present invention is mainly comprised of a rear triangular portion 19 which extends rearward from the forward rectangular portion 19b, the forward rectangular portion 19b comprised of said first and second food recesses 22 and 26 and said drink recess 24.

Figure 2:
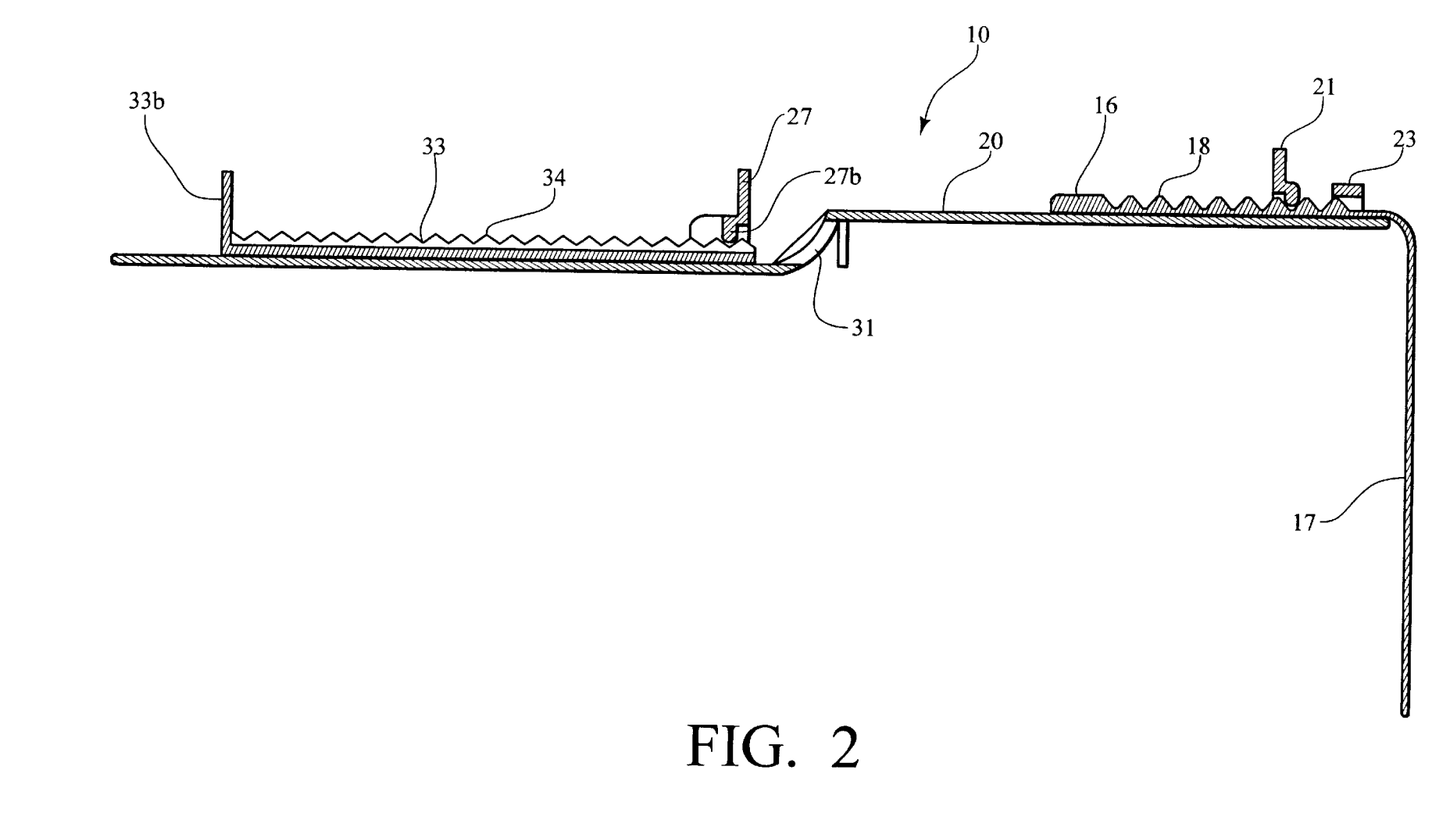
FIG. 2 is a sectional side view of the tray shown in FIG. 1.

The tray 20 is supported by an L-shaped retaining bracket 12 which is movably and frictionally engaged with the rear triangular portion 19. The L-shaped retaining bracket 12, more clearly shown in FIG. 2, is adjustably held in place on said rear triangular portion 19 by third retaining tab 21. As shown in FIG. 2, the support portion 16 of the bracket 12 contains a plurality ridges 18. Depending from the support portion 16 is the vertical anchor 17 which, depending upon the object the food and beverage tray is being affixed to, slides over a vertical support member not shown in this figure.

The plurality of ridges 18 on the support portion 16 of bracket 12 work in conjunction with the retaining tab 21 as the support portion 16 slides through retaining tab 21 and through shoulder 23. The adjustable nature of the retaining bracket 12 through horizontal extension of the bracket allows the food and beverage tray 10 to be securely affixed to variable width vertical support members 50, as shown in FIG. 3.

Figures 3, 4, 5:
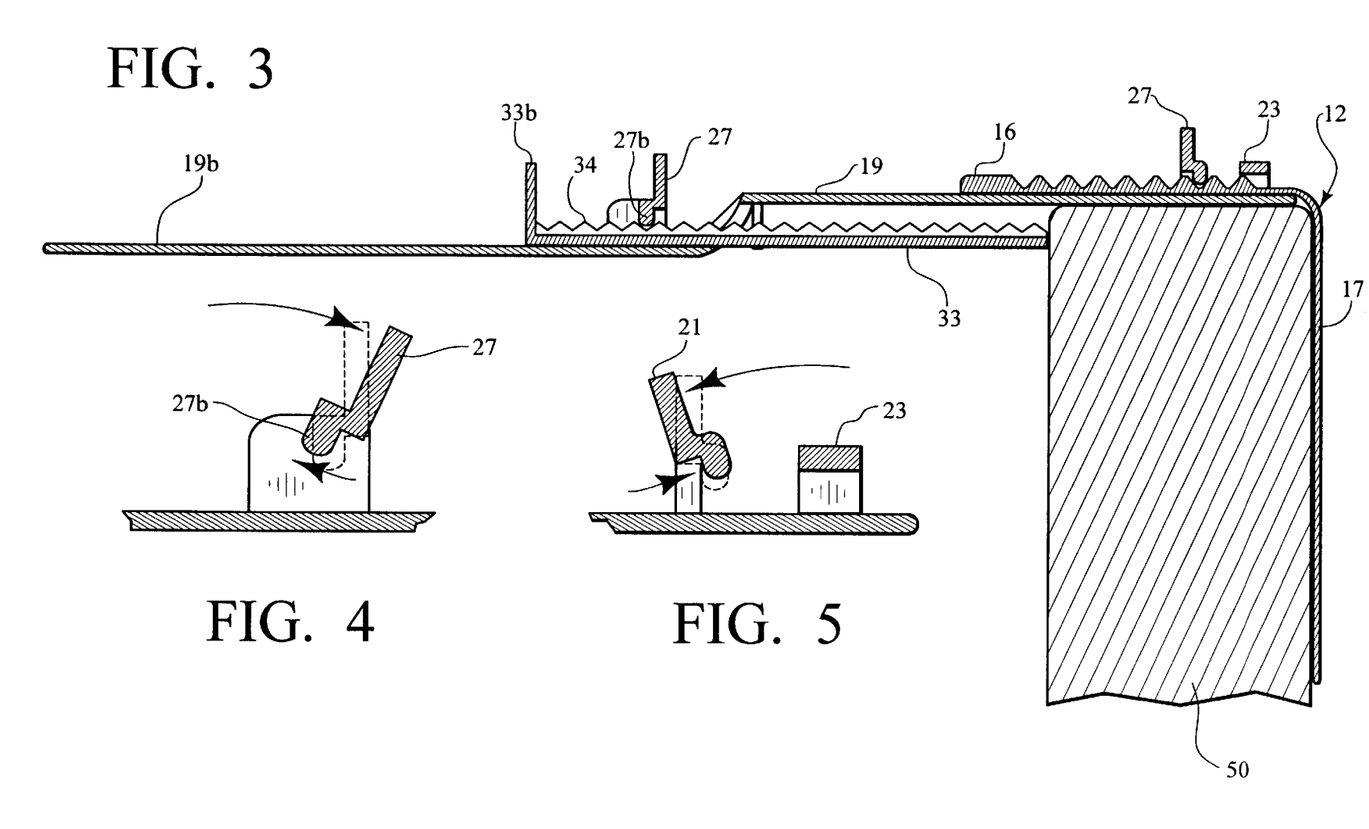
FIG. 3 is a sectional side view of the food and beverage tray holder FIG. 1 wherein the tray is securely affixed to a vertical support member.
FIG. 4 is a close-up side sectional view of the retaining tabs for the strut members of the present invention.
FIG. 5 is a close-up side sectional view of the retaining tab for the L-shaped bracket of the present invention.

A clearer understanding of the adjustability for the L-shaped retaining bracket 12 is shown in FIG. 3 whereby a vertical support member 50 of significant width is used to retain the food and beverage tray 10. Bracket 12 is slidable below shoulder 23 to properly adjust the secure attachment of the rear triangular portion 19 atop the vertical support member 50. Tab 21 engages ridges 18 to secure the support portion 16 of the bracket at the proper position. This adjustability of the bracket 12 asures secure fastening of tray 20 on many types of surfaces.

The adjustable nature of the L-shaped retaining bracket 12 works in conjunction with the first strut member 32 and second strut member 33, shown in FIG. 1. First and second strut members 32 and 33 act to provide adjustable compressive force against the vertical support member 50 to which the food and beverage tray 10 hangs upon and is affixed to. The compressive force supplied by the first and second strut members 32 and 33 allows the food and beverage tray to be adjusted to varying thickness vertical support members which rest between the vertical anchor 17 of the retaining bracket 12 and the distal end portions of strut 15 members 32 and 33 as is shown in FIG. 3. Thus even high weight food items places on forward portion 19b of tray 10 are secured by the combined structure of the adjustable support bracket 12 and compressing struts 32 and 33.

Similarly to the third retaining tab 21 shown in FIG. 2, a second retaining tab 27 is thereby shown wherein the second strut member 33, having plurality of upwardly extending ridges 34 work in conjunction with the retaining tab 27 to securely hold the second strut member 33 in place. Second strut member 33 extends rearwardly, that is to say towards the right as displayed in FIG. 2, such that the strut member 33 enters through the aperture 31 toward the vertical anchor 17. Thus, as shown in FIG. 2 and in FIG. 3, both the L-shaped retaining bracket 12 and the first and second strut members 32 and 33 are adjustable to sufficiently apply adequate force such that the tray 10 is supported in an upright position. Although in FIG. 2 only the second strut member 33 is shown, both the first and second strut members 32 and 33 work in similar fashion with first strut member 32 having a first aperture 30 through which to extend and additionally having first retaining tab 29 thereabove for frictionally engaging the ribs on said first strut member 32.

Between rear portion 19 and forward portion 19b of tray 10 is beveled area 37 which allows the front portion 19b to be lower than the rear portion. Through this beveled edge 37 are apertures 30 and 31 through which the struts 32 and 33 extend.

Both the first and second strut members 32 and 33 have grasping tabs 32b and 33b respectively. Grasping tabs 32b and 33b allow the strut member 32 and 33 to be easily moveable through the first aperture 30 and second aperture 31. A shown in FIG. 3 and FIG. 4, the second retaining tab 27 shown FIG. 3 acts to lock the strut member 33 in place by frictionally engaging ridges 34. The second retaining tab 27 as shown in FIG. 4 is provided to slightly rotate or bend clockwise in order to raise the engaging member 27b upward away from the ridges 34. The ability to rotate the tab 27 may be from providing an axis of rotation within the tab or allowing the tab, through manufacturing of plastic material, to deform sufficiently such that engaging member 27b may be raised sufficiently to avoid the ridges 34. First retaining tab 29 and second retaining tab 27 act similarly on the strut members 32 and 33 so that the strut members may be locked in place against the vertical support member on which the food and beverage tray 10 is hung.

Similarly, as shown in FIG. 5, the retaining bracket 12 having support portion 16 and ridges 18 thereon are locked in place by third retaining tab 21 which is similarly rotatable or deformable. Support portion 16 slides through shoulder 23 so that the vertical anchor 17, not shown in FIG. 5, is adjustable to varying width vertical support members.

As shown in FIG. 3, the second strut member 33 is adjusted rearwardly and locked in place by second retaining tab 27 against the vertical support member 50. Additionally, the L-shaped retaining bracket 12 having the depending vertical anchor 17 is locked in place thereby providing sufficient support both vertically and laterally for the forward portion 19b of the food and beverage tray. Providing sufficient support for the food and beverage tray is of particular interest in that higher weights may be supported.

Figure 6:
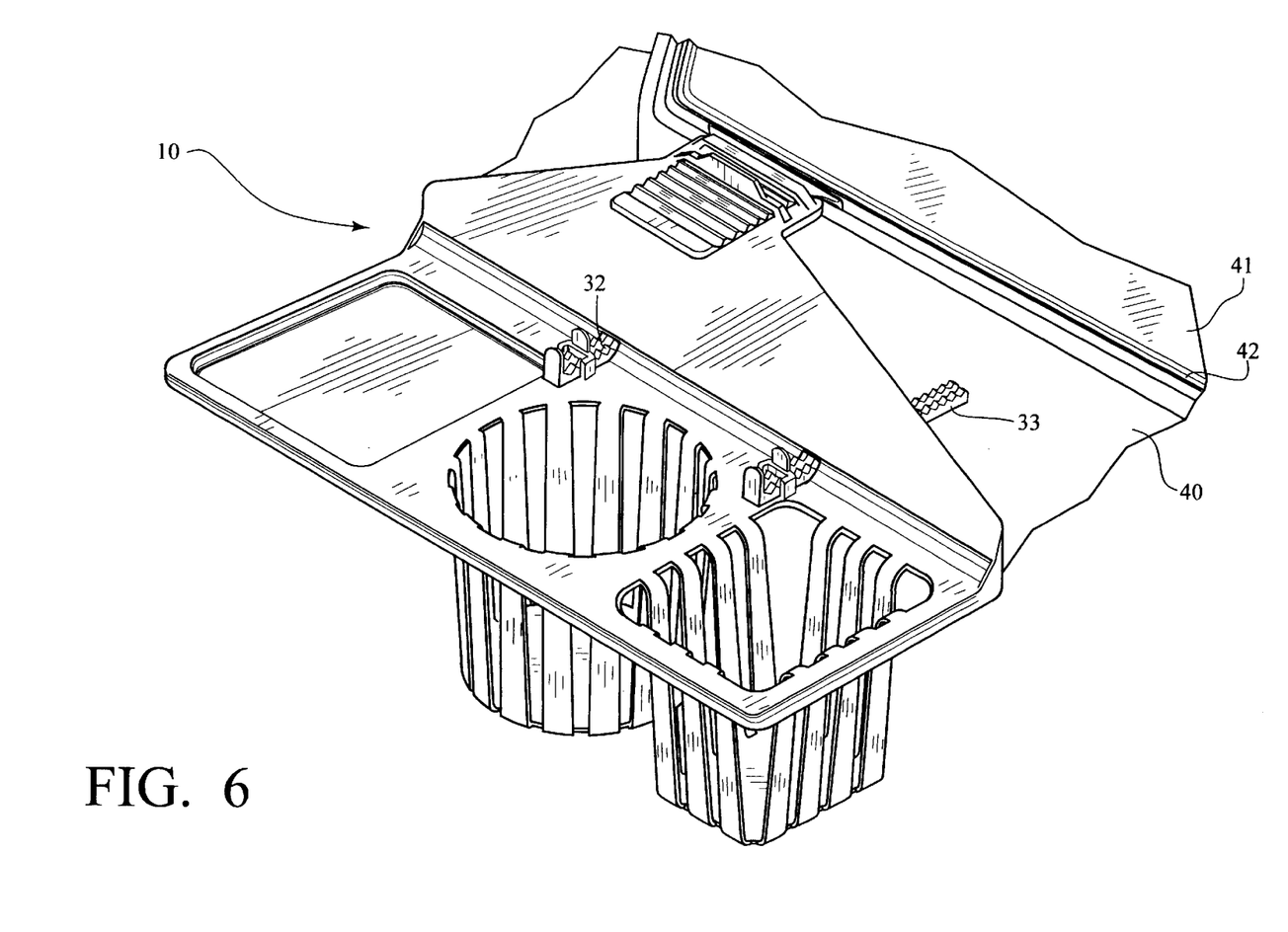
FIG. 6 is a perspective view of the food and beverage tray of the present invention securely attached to a car door vertical support member.

Turning to FIG. 6, the food and beverage tray 10 of the present invention is shown securely affixed to the side of car door 40. Vertical anchor 17 is fitted between the car door lip 42 and glass 41, while the first and second strut members 32 and 33 are extended rearwardly to compress against the car door surface 40. Thus, even where the vertical support member is a relatively thin section, the food and beverage tray 10 of the present invention is sufficiently adjustable so that the tray is fully supported on the vertical support member and is firmly retained thereon. It is of import to firmly retain the tray 10 of the present invention such that little or no spilling of the contents on the tray occurs. The first and second strut members 32 and 33 provide such a function for adequate lateral support of the tray by being compressively adjustable against the vertical support member.

Figure 7:
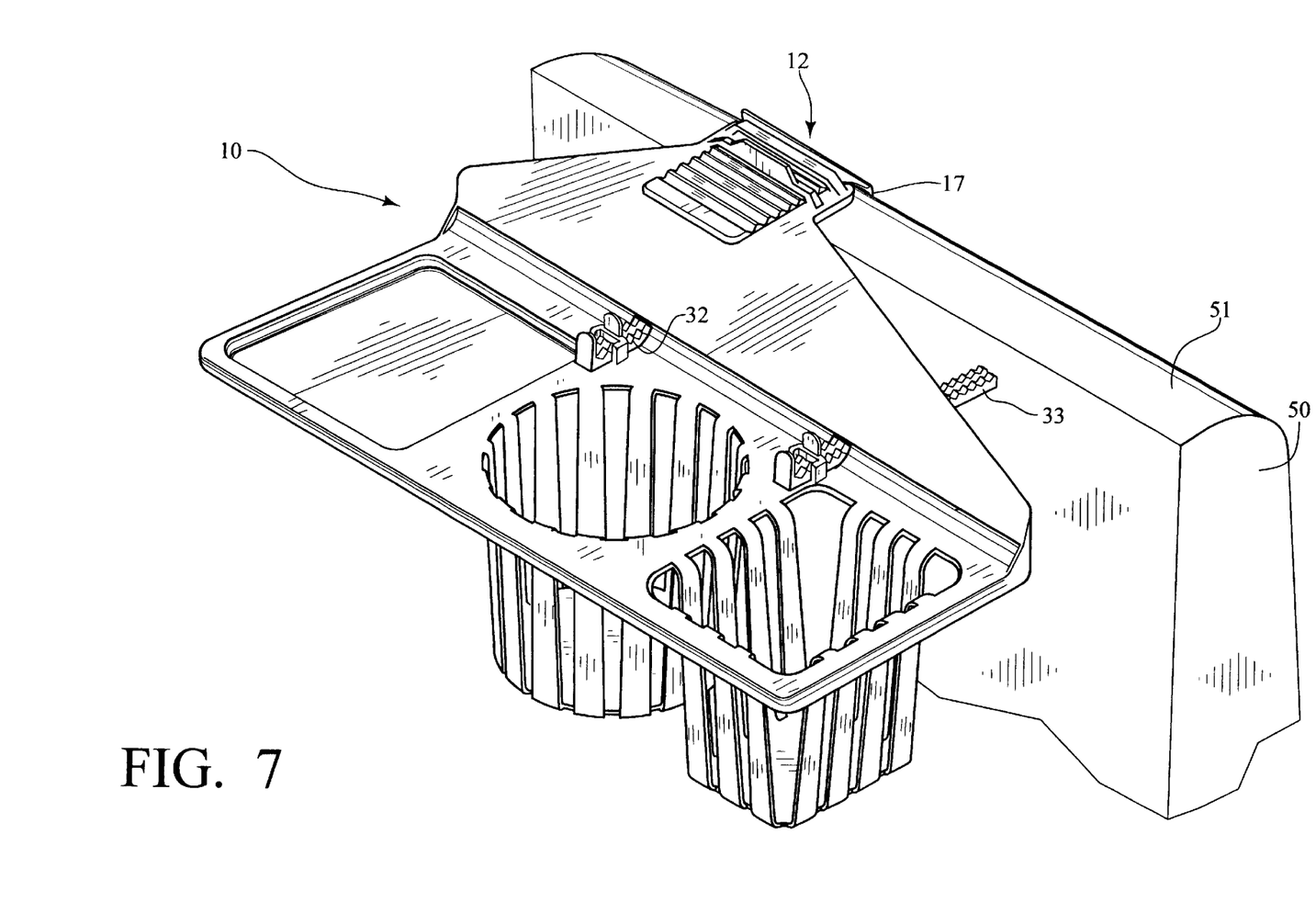
FIG. 7 is a perspective view of the food and beverage tray of the present invention securely affixed to the seat back of a chair.

Alternatively as shown in FIG. 7, a seat back 50 is shown wherein the L-shaped bracket 12 is hung over the upper edge 51 of the seat 50. First and second strut members 32 and 33 are again allowed to compress against the rear portion of the seat and locked into place so that sufficient support both vertically and laterally is provided. Thus, the design of the present invention, provides multiple adjustment means for supporting the tray on variable width vertical support members and allows the tray to adequately support food and beverages while securing the tray and preventing the movement thereof. Further, as can be readily seen, the design of the current tray allows secure attachment to even non-planar surfaces, such as the curved seat back of a stadium type chair.

Figure 8:
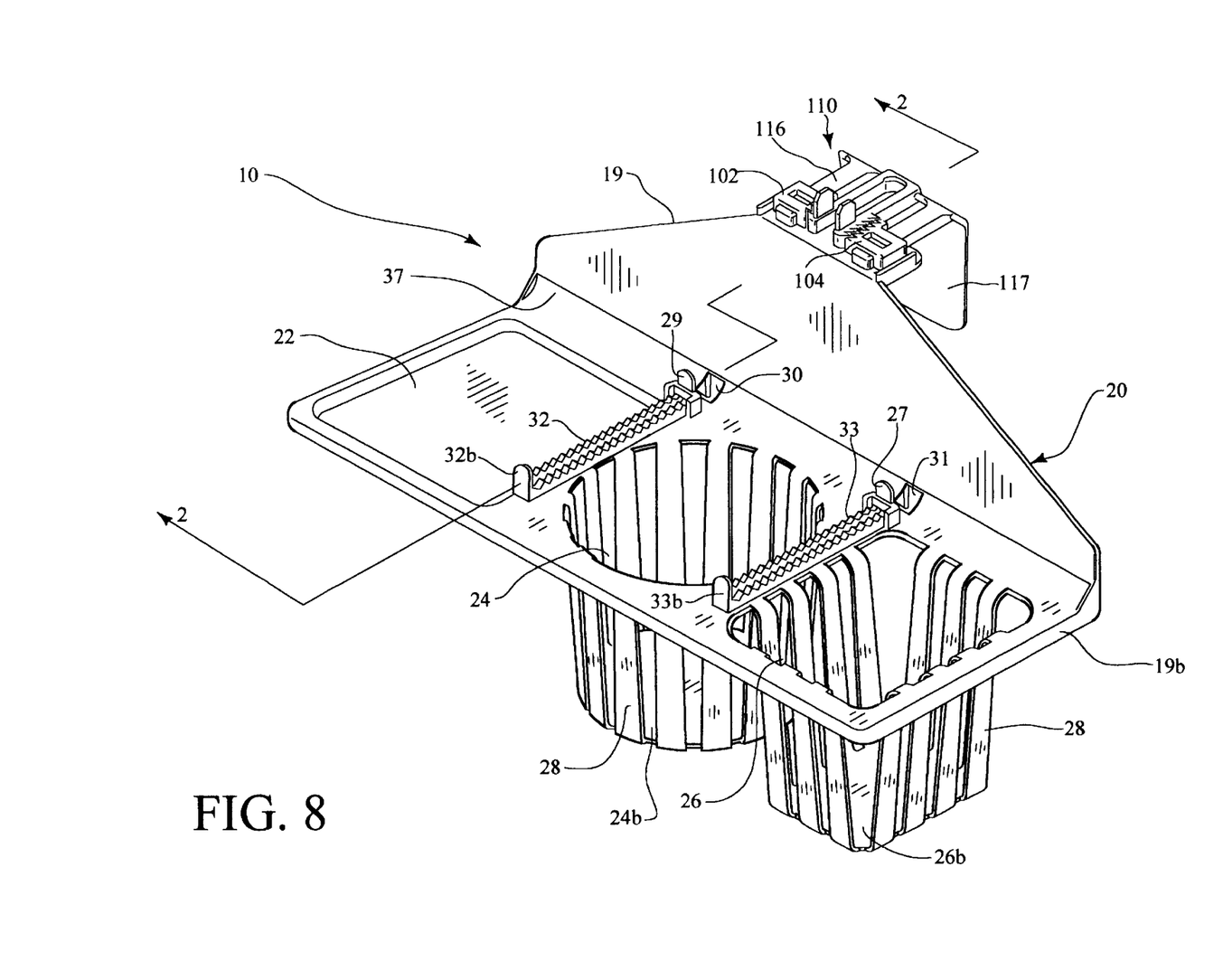
FIG. 8 is a perspective view of an alternative embodiment of the present invention; and, FIG. 9 is a close-up perspective view of the adjustable locking means for the embodiment of the present invention shown in FIG. 8.
Figure 9:
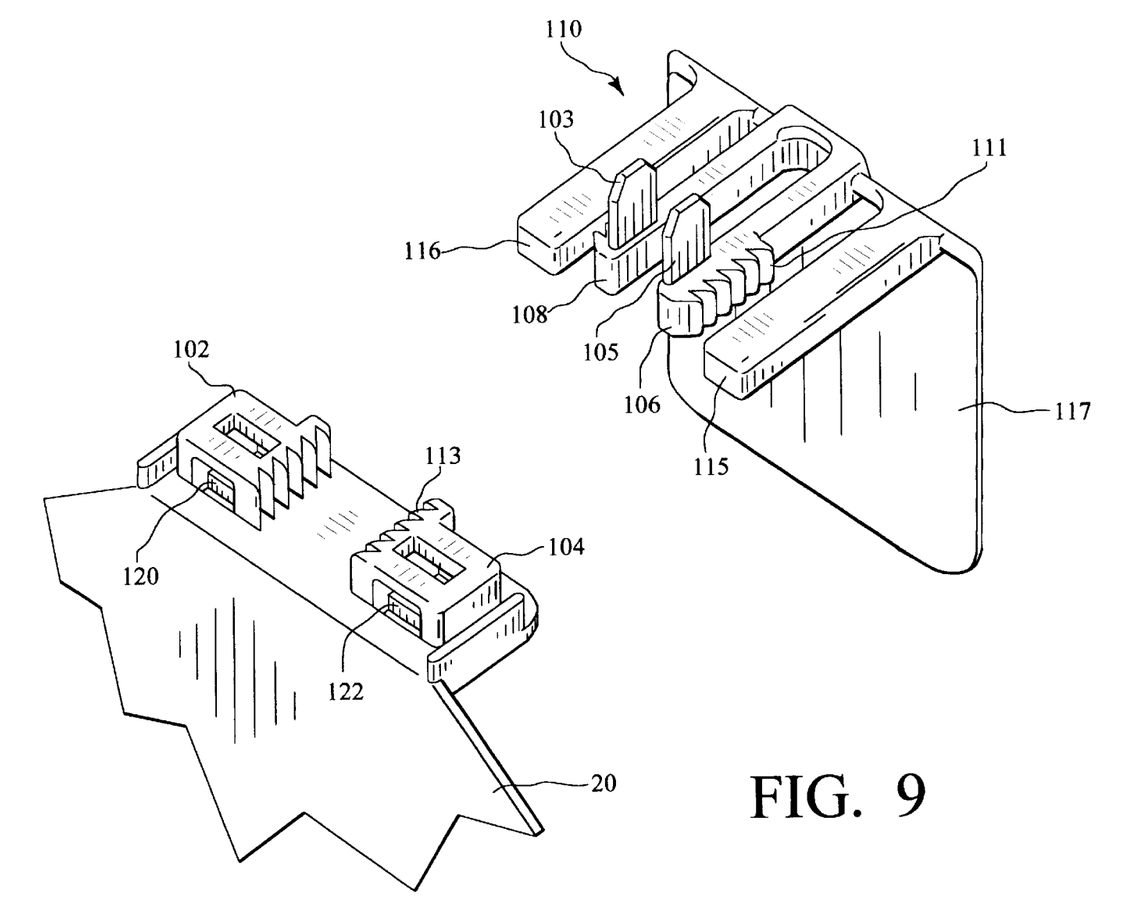

An alternative embodiment of the tray 100 is shown in FIG. 8 wherein an alternative L-shaped vertical anchor 117 and positional locking or retaining sleeve 102 and 104 are shown. As can be seen in combination with FIG. 9, connecting assembly 110 is comprised of vertical anchor 117 which has extending rearward for engagement with tray 20 a first and second leg member 115 and 116. Legs 115 and 116 telescope into first and second retaining sleeves 102 and 104 through apertures 120 and 122. Legs 115 and 116 also act to support the tray in the connection between vertical anchor 117 and tray 20. Legs 115 and 116 are retained within sleeves 102 and 104 while stems 106 and 108 extend rearward in between sleeves 102 and 104. Threads 113 formed on the inner side portion of sleeves 102 and 104 coact with oppositely formed threads 111 formed on the outwardly facing portion of stems 106 and 108. As the vertical anchor is moved rearwardly to engage tray 20, threads 111 of stems 106 and 108 lock the stems in place so that, in order to disengage anchor 117 from tray 20, tabs 103 and 105 must be compressed together thereby disengaging the threads and allowing legs 115 and 116 to be removed.

The foregoing detailed description is given primarily for clearness of understanding and no unnecessary limitation are to be understood therefrom for modifications will become obvious to those skilled in the art upon reading this disclosure and may be made without departing from the spirit of the invention or the scope of the appended claims.

What We claim is:

1. A food and beverage tray, comprising:
    a tray, said tray having a rear portion and a forward portion, said forward portion having an area for receiving food;
    wherein said rear portion has an L-shaped retaining bracket extending rearwardly therefrom, said retaining bracket having a horizontal support portion and vertical anchor portion depending therefrom, said L-shaped retaining bracket being frictionally retained on said rear portion of said tray by a retaining tab contacting said retaining bracket;
    at least one rearwardly extending strut member extending rearwardly towards said L-shaped retaining bracket.

2. The tray of claim 1 further comprising an upstanding shoulder formed on said rear portion of said L-shaped bracket, said L-shaped bracket frictionally extending therethrough.

3. The tray of claims 2 wherein said retaining tab is a rotatable retaining tab adjacent to said shoulder, said vertical anchor portion of said L-shaped bracket having a plurality of upstanding ridges thereon, said retaining tab extending downward toward said ridges to frictionally engage said ridges and retain said L-shaped bracket in position.

4. The tray of claim 1 wherein said at least one rearwardly extending strut member is comprised of a first strut member and a second strut member, said first and second strut members frictionally slidable on said tray.

5. The tray of claim 4 further comprising:
    first and second retaining tabs located on said forward portion of said tray;
    wherein each of said first and second strut members has a plurality of ridges formed thereon, said first strut member frictionally engaging said first retaining tab and said second strut member frictionally engaging said second retaining tab.

6. The tray of claim 5 further comprising:
    first and second apertures formed along a line where said rear portion of said tray meets said forward portion of said tray, said forward portion of said tray below said rear section;
    first and second apertures formed along said line between said rear portion and said forward portion;
    wherein said first strut member extends rearwardly through said first aperture and said second strut member extends rearwardly through said second strut member.

7. The tray of claim 6 wherein said first retaining tab is adjacent said first aperture and said second retaining tab is adjacent to said second aperture.

8. The tray of claim 7 wherein said forward portion of said tray is further comprised of a drink recess, a first food recess and a second food recess, said drink recess and said second food recess depend below said forward portion of said tray and having a plurality of ribs extending therebelow, said plurality of ribs on said drink recess extending downward to a drink recess base portion, said plurality of ribs on said second food recess extending downward to a second food recess base portion.

9. The tray of claim 1 further comprising:
    at least one leg extending rearwardly from said horizontal support portion, said at least one leg being received within at least one retaining sleeve formed on said rear portion of said tray.

10. The tray of claim 9 wherein said at least one retaining sleeve is a rectangular sleeve having an aperture therethrough, said aperture receiving said at least one leg.

11. The tray of claim 10 wherein said at least one retaining sleeve has a threaded surface and wherein said at least one leg on said support portion has a threaded surface, said threaded surfaces frictionally engageable with each other.

12. The tray of claim 1 further comprising:
    first and second legs and first and second stems extending rearwardly from said horizontal portion, said first and second stem located in between said first and second legs;
    first and second sleeves formed on said rear portion of said tray, each of said first and second sleeve having an aperture therethrough for receiving said first and second legs;
    wherein said first stem is frictionally engageable with said first sleeve and wherein said second leg is frictionally engageable with said second sleeve.

13. A food and beverage tray, comprising:

a tray, said tray having a rear portion and a forward portion, said forward portion having an area for receiving food, said rear portion and said forward portion separated by a beveled area therebetween;

an L-shaped retaining bracket extending rearwardly from said rear portion, said retaining bracket having a horizontal support portion and vertical anchor portion depending therefrom, said L-shaped retaining bracket being frictionally retained on said rear portion of said tray by a retaining tab contacting said retaining bracket;

first and second rearwardly extending strut members extending rearwardly towards said L-shaped retaining bracket.

14. The tray of claim 13 wherein said first and second strut members are adjustable in said rearward direction.

15. The tray of claim 13 further comprising a beveled section between said rear portion and said forward portion of said tray, said forward portion thereby being below said rear portion.

16. The tray of claim 15 wherein said beveled section has first and second apertures, said first strut member extending through said first aperture and second strut member extending through said second aperture.

17. The tray of claim 16 further comprising:

first and second retaining tabs, said first retaining tab in front of said first aperture, said second retaining tab in front of said second aperture;

said first and second strut members having a plurality of ridges formed on the top surface thereof, whereby said first retaining tab frictionally engages said ridges on said first strut member and said second retaining tab frictionally engages said ridges on said second strut member.

18. The tray of claim 15 wherein said forward portion of said tray is comprised of a first food recess, a second food recess and a drink recess.

19. The tray of claim 13 wherein said rear portion of said tray has an upstanding shoulder below which is an aperture, said support portion of said bracket extending through said shoulder.

20. The tray of claim 18 further comprising:

a retaining tab adjacent to said shoulder and located above said support portion;

a plurality of ridges on the upper surface of said support portion;

whereby said retaining tab frictionally engages said plurality of ribs.

21. The tray of claim 13 further comprising:

at least one leg extending rearwardly from said horizontal support portion, said at least one leg being received within at least one retaining sleeve formed on said rear portion of said tray.

22. The tray of claim 21 wherein said at least one leg and said at least one sleeve are comprised of a first leg and a second leg extending rearwardly from said retaining bracket and received within first and second sleeves formed on said rear portion of said tray.

23. The tray of claim 22 further comprising first and second stems extending rearwardly from said retaining bracket, said first and second stems frictionally engaging said first and second retaining sleeves.

24. A food and beverage tray, comprising:

a tray for receiving food thereon;

a retaining bracket frictionally movable on said tray and extending rearwardly therefrom;

at least one horizontal stabilizer extending rearwardly from said tray towards said retaining bracket;

wherein said at least one stabilizer is comprised of a first strut member and a second strut member rearwardly movable towards said retaining bracket and wherein said tray is further comprised of:

a retaining sleeve on said tray;

a leg extending from said retaining bracket towards said tray and receivable within said sleeve;

a stem extending from said retaining bracket towards said tray and frictionally engageable with said retaining sleeve.

25. A food and beverage tray, comprising:

a tray for receiving food thereon;

a retaining bracket frictionally movable on said tray and extending rearwardly therefrom;

at least one horizontal stabilizer extending rearwardly from said tray towards said retaining bracket;

first and second retaining sleeves on said tray and having an aperture therethrough;

first and second legs on said retaining bracket extending towards said tray and through said first and second retaining sleeves;

first and second stems on said retaining bracket and extending towards and engageable respectfully with said first and second retaining sleeve.

26. The tray of claim 25 wherein said first and second retaining sleeves have a threaded portion inwardly directed towards each other and further wherein said first and second stems extend inbetween said first and second sleeves on said tray.

* * * * *